US012653192B2

(12) United States Patent
Schneider et al.

(10) Patent No.: US 12,653,192 B2
(45) Date of Patent: Jun. 16, 2026

(54) PESTICIDAL COMPOSITIONS

(71) Applicant: SYNGENTA CROP PROTECTION AG, Basel (CH)

(72) Inventors: Daniel Schneider, Münchwilen (CH); Christian Popp, Münchwilen (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 464 days.

(21) Appl. No.: 18/551,219

(22) PCT Filed: Mar. 17, 2022

(86) PCT No.: PCT/EP2022/056920
§ 371 (c)(1),
(2) Date: Sep. 19, 2023

(87) PCT Pub. No.: WO2022/194982
PCT Pub. Date: Sep. 22, 2022

(65) Prior Publication Data

US 2024/0172754 A1 May 30, 2024

(30) Foreign Application Priority Data

Mar. 19, 2021 (EP) .................................... 21163726

(51) Int. Cl.

| | |
|---|---|
| ***A01N 43/90*** | (2006.01) |
| ***A01N 25/04*** | (2006.01) |
| ***A01N 47/06*** | (2006.01) |
| ***A01P 7/02*** | (2006.01) |
| ***A01P 7/04*** | (2006.01) |

(52) U.S. Cl.
CPC ............. *A01N 47/06* (2013.01); *A01N 25/04* (2013.01); *A01P 7/02* (2021.08); *A01P 7/04* (2021.08)

(58) Field of Classification Search
CPC ........ A01N 43/90; A01N 25/04; A01N 25/30; A01P 7/04
USPC .................................................. 504/130, 209
See application file for complete search history.

(56) References Cited

U.S. PATENT DOCUMENTS

2015/0259345 A1 9/2015 Muehlebach

FOREIGN PATENT DOCUMENTS

| | | | |
|---|---|---|---|
| TW | 201021709 | A | 6/2010 |
| WO | 2010/066780 | A1 | 6/2010 |
| WO | 2018/114648 | A1 | 6/2018 |
| WO | 2018/114649 | A1 | 6/2018 |
| WO | 2020169651 | A1 | 8/2020 |
| WO | 2020208098 | A1 | 10/2020 |

OTHER PUBLICATIONS

EPO; App. No. EP 21163726.9; Extended European Search Report mailed Oct. 1, 2021; pp. 1-10.
Muehlebach et al.; "Spiro N-methoxy piperidine ring containing aryldiones for the control of sucking insects and mites: discovery of spiropidion"; Pest Management Science; vol. 76, No. 10; Feb. 6, 2020; pp. 3440-3450; XP055843120.
Smytheman et al.; "Effect of insecticides on woolly apple aphid, 2020"; Arthropod Management Tests; vol. 46, No. 1-2; Mar. 12, 2021, pp. 1-2; XP055843110.
WIPO; App. No. PCT/EP2022/056920; International Search Report and Written Opinion mailed Jun. 20, 2022; pp. 1-12.

*Primary Examiner* — Charanjit Aulakh
(74) *Attorney, Agent, or Firm* — BakerHostetler; Toni-Junell Herbert

(57) ABSTRACT

A pesticidal composition comprising: (a) 20 to 35% by weight of spiropidion as active ingredient, and (b) 5.5 to 15% by weight of a dispersing agent combination, comprising: (i) 5 to 10% by weight of the total composition of an acrylic graft copolymer solution in water and propylene glycol; and (ii) 0.5 to 5% by weight of the total composition of a sodium alkyl naphthalene sulfonate formaldehyde condensate.

15 Claims, No Drawings

PESTICIDAL COMPOSITIONS

CROSS-REFERENCE TO RELATED APPLICATIONS

This application is a U.S. National Stage Application, filed under 35 U.S.C. § 371, of International Application No. PCT/EP2022/056920, filed Mar. 17, 2022, which claims priority to EP 21163726.9, filed Mar. 19, 2021, the entire contents of which are incorporated by reference herein.

The present invention relates to a pesticidal composition, in particular a suspension concentrate composition, comprising an insecticidal active ingredient, to the preparation thereof and to a method of using such a composition to control pests in crops of useful plants.

WO 2010/066780, WO 2018/114648 and WO 2018/114649 disclose that certain spiroheterocyclic pyrrolidine dione derivative compounds (including spiropodion) have pesticidal activity, in particular, insecticidal and acaricidal activity. The activity of such compounds applied to plants in a pesticide spray formulation may be enhanced with the use of a pesticide adjuvant, which is a substance which when present in a pesticide spray formulation improves pesticidal active ingredient performance, for example by facilitating the spreading of the active ingredient on a leaf surface or penetration into the leaf and so the plant's vasculature. Under certain circumstances, the adjuvant substance is not a component of the active ingredient concentrate, rather is added to a spray tank along with an active ingredient concentrate prior to application on the plant.

Accordingly, there remains a strong motivation to develop stable and effective insecticidal compositions comprising spiropidion which are suitable for use with adjuvants in order to enhance product penetration, whilst also possessing a favourable crop safety profile, eg, for the use on fruit and vegetable plants.

According to the present invention, there is provided a pesticidal composition comprising:

- (a) 20 to 35% by weight of spiropidion as active ingredient, and
- (b) 5.5 to 15% by weight of a dispersing agent combination, comprising:
  - (i) 5 to 10% by weight of the total composition of an acrylic graft copolymer solution in water and propylene glycol; and
  - (ii) 0.5 to 5% by weight of the total composition of a sodium alkyl naphthalene sulfonate formaldehyde condensate.

The pesticidal compositions of the present invention have, for practical purposes, a very advantageous level of activity in controlling insect pests in crops of useful plants after foliar or soil application, whilst also maintaining acceptable crop safety (phytotoxicity) outcomes. By activity, it is meant that the compositions of the invention are capable of killing or controlling insects, retarding the growth or reproduction of insects, reducing an insect population, and/or reducing damage to plants caused by insects. The pesticidal compositions of the present invention also possess strong storage stability for both the overall composition and the active ingredient component, particularly at elevated temperature.

Further according to the invention, there is provided an aqueous composition comprising the pesticidal composition according the invention, optionally further comprising one or more adjuvants or carriers. The adjuvant may be selected from a mineral oil, a vegetable oil, an esterified vegetable oil, a methylated vegetable oil or an alkyl ester phosphate-based adjuvant.

Still further according to the invention, there is provided a (non-therapeutic) method of combating and controlling pests which comprises applying to a pest, to a locus of a pest (eg, soil), or to a crop of a useful plant susceptible to attack by a pest a composition according to the invention.

Spiropidion ([3-(4-chloro-2,6-dimethyl-phenyl)-8-methoxy-1-methyl-2-oxo-1,8-diazaspiro[4.5]dec-3-en-4-yl] ethyl carbonate. CAS no.: 1229023-00-0) is known inter alia from WO 2010/066780, WO 2018/114648 and WO 2018/114649.

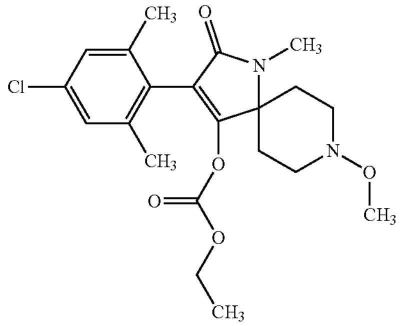

Spiropidion

Preferably, the composition according to the present invention comprises as the pesticidal active ingredient component 25 to 30% by weight of spiropidion, and preferably 26 to 29% by weight of spiropidion.

Preferably, the composition according to the present invention is a suspension concentrate (SC), which is a stable suspension of a solid pesticidal active ingredient compound in a liquid, usually intended for dilution with water (in a spray tank or other vessel) before use.

A dispersant or a dispersing agent is typically a surfactant substance, which when added to a suspension of solid particles in a liquid better enables the separation of the particles to avoid their settling or clumping together. The dispersant system of the compositions according to the invention comprises two components (i) and (ii).

Dispersants (non-ionic) which may be used in component (i) of the dispersing agent combination in accordance with the present invention may comprise a graft copolymer which is a 2-methyl-2-propenoic acid and methyl 2-methyl-2-propenoate polymer with α-methyl-Ω-hydroxypoly(oxy-1,2-ethanediyl) graft. In certain embodiments, this may be otherwise defined as a methyl methacrylate/methacrylic acid/monomethoxypolyethylene glycol (PEG) methacrylate graft copolymer (eg, Atlox™ 4913, Uniqema Surfactants Ltd, UK). Such surfactant component may have a minimum number average molecular weight of 2,500 to 3000 Da, and preferably 2,650 to 2,800 Da. Preferably, component (i) is present at 6 to 9% by weight of the total composition, and more preferably 7 to 8% by weight of the total composition.

Component (ii) of the dispersing agent combination is a sodium alkyl naphthalene sulfonate formaldehyde condensate (eg, Morwet D-425, Nouryon Surface Chemistry AB, Sweden. CAS no.: 9084-06-4 ($(C_{10}H_8O_3S \cdot CH_2O)_n \cdot xNa$)). Preferably, component (ii) is present at 1 to 3% by weight of the total composition.

Preferably, the compositions according to the invention comprise 3 to 8% by weight of an anti-freeze agent (more preferably, 4 to 6% by weight), which may be selected from ethylene glycol or propylene glycol.

Preferably, the compositions according to the invention comprise 0.1 to 2% by weight of a thickening agent, which may be selected from a natural gum substance, such as guar gum or xanthan gum.

Preferably, the compositions according to the invention comprise 0.1 to 2% by weight of a buffering agent. Preferably, the buffering agent is an organic acid that contains 1, 2 or 3 carboxylic acid groups. More preferably, the organic acid is a tricarboxylic acid (ie, contains three carboxylic acid groups) such as citric acid, or a sodium or potassium salt thereof.

Preferably, the compositions according to the invention comprise an amount (less than 0.5% by weight) of a preservative or anti-microbial agent.

The compositions of the invention may additionally comprise water up to 100% by weight of the composition.

Preferably, in an aqueous composition according to the invention (eg, a tank mix preparation for applying to a crop), the adjuvant is selected from a mineral oil, a vegetable oil, an esterified vegetable oil, a methylated vegetable oil or an alkyl ester phosphate-based adjuvant. A pesticide adjuvant may be defined as a substance present in a pesticidal composition (eg, a concentrated active ingredient formulation diluted in water in a tank for a foliar spray application on a crop), which improves pesticidal active ingredient performance, for example by facilitating the spreading of the active ingredient on a leaf surface or penetration into the leaf of the crop plant.

Examples of adjuvant classes, which may be used in accordance with the present invention include a mineral oil, a vegetable oil, an esterified vegetable oil, a methylated vegetable oil or an alkyl ester phosphate-based adjuvant. Commercially-available adjuvant products which may be tank-mixed to yield a spray formulation with the composition of the present invention include HASTEN™ (Victorian Chemical Co. Pty. Ltd.—blend of an esterified vegetable oil and non-ionic surfactants), OCHIMA® (Syngenta—alkyl ester of phosphoric acid (EC formulation)), LEDNA™ (Polaquimia—EC formulation comprising a methyl ester of soybean oil), Atplus® 463 (CRODA Europe Limited—60% paraffin oil with surfactant blend), Actirob® B (Bayer AG—rapeseed oil methyl ester (esterified vegetable oil)), Destiny® HC (Winfield Solutions LLC—methylated soybean oil), DYNE-AMIC® (HELENA—blend of (methylated) vegetable oil and organosilicone-based nonionic surfactants), and FS Optique™ (GROWMARK, Inc—methyl ester of canola oil). If an alkyl ester phosphate-based adjuvant is used in conjunction with the pesticidal composition according to the invention (ie, in a tank mix), the alkyl ester phosphate of the adjuvant is preferably tris-(2-ethylhexyl) phosphate, preferably in combination with ethoxylated sorbitol, hexaoleate, eg, OCHIMA®—EC, Syngenta.

An anti-foaming agent is a chemical additive that reduces and hinders the formation of foam in a composition, such as a pesticidal formulation. Anti-foaming agents which may be used in accordance with the present invention include, but are not limited to, polydimethylsiloxanes (eg, XIAMETER™ ACP-1500, Dow, Inc; Antifoam MSA, Univar; Xiameter ACP-0001, Dow Brasil; Xiameter ACP-0100, Dow Chemical; SAG™ 1572, Momentive Performance Materials Inc.).

A filler may be used in accordance with the present invention.

Examples of pests which may be controlled in accordance with the compositions of the present invention include those:

from the order Acarina, for example, *Acalitus* spp, *Aculus* spp, *Acaricalus* spp, *Aceria* spp, *Acarus siro, Amblyomma* spp., *Argas* spp., *Boophilus* spp., *Brevipalpus* spp., *Bryobia* spp, *Calipitrimerus* spp., *Chorioptes* spp., *Dermanyssus gaffinae, Dermatophagoides* spp, *Eotetranychus* spp, *Eriophyes* spp., *Hemitarsonemus* spp, *Hyalomma* spp., *Ixodes* spp., *Olygonychus* spp, *Ornithodoros* spp., *Polyphagotarsone latus, Panonychus* spp., *Phyllocoptruta oleivora, Phytonemus* spp, *Polyphagotarsonemus* spp, *Psoroptes* spp., *Rhipicephalus* spp., *Rhizoglyphus* spp., *Sarcoptes* spp., *Steneotarsonemus* spp, *Tarsonemus* spp. and *Tetranychus* spp.;

from the order Anoplura, for example, *Haematopinus* spp., *Linognathus* spp., *Pediculus* spp., *Pemphigus* spp. and *Phylloxera* spp.;

from the order Coleoptera, for example, *Agriotes* spp., *Amphimallon majale, Anomala orientalis, Anthonomus* spp., *Aphodius* spp, *Astylus atromaculatus, Ataenius* spp, *Atomaria linearis, Chaetocnema tibialis, Cerotoma* spp, *Conoderus* spp, *Cosmopolites* spp., *Cotinis nitida, Curculio* spp., *Cyclocephala* spp, *Dermestes* spp., *Diabrotica* spp., *Diloboderus abderus, Epilachna* spp., *Eremnus* spp., *Heteronychus arator, Hypothenemus hampei, Lagria vilosa, Leptinotarsa decemLineata, Lissorhoptrus* spp., *Liogenys* spp, *Maecolaspis* spp, *Maladera castanea, Megascelis* spp, *Melighetes aeneus, Melolontha* spp., *Myochrous armatus, Orycaephilus* spp., *Otiorhynchus* spp., *Phyllophaga* spp, *Phlyctinus* spp., *Popiffia* spp., *Psyffiodes* spp., *Rhyssomatus aubtilis, Rhizopertha* spp., *Scarabeidae, Sitophilus* spp., *Sitotroga* spp., *Somaticus* spp, *Sphenophorus* spp, *Sternechus subsignatus, Tenebrio* spp., *Tribolium* spp. and *Trogoderma* spp.;

from the order Diptera, for example, *Aedes* spp., *Anopheles* spp, *Antherigona soccata, Bactrocea oleae, Bibio hortulanus, Bradysia* spp, *Calliphora erythrocephala, Ceratitis* spp., *Chrysomyia* spp., *Culex* spp., *Cuterebra* spp., *Dacus* spp., *Delia* spp, *Drosophila melanogaster, Fannia* spp., *Gastrophilus* spp., *Geomyza tripunctata, Glossina* spp., *Hypoderma* spp., *Hyppobosca* spp., *Liriomyza* spp., *Lucilia* spp., *Melanagromyza* spp., *Musca* spp., *Oestrus* spp., *Orseolia* spp., *Oscinella frit, Pegomyia hyoscyami, Phorbia* spp., *Rhagoletis* spp, *Rivelia quadrifasciata, Scatella* spp, *Sciara* spp., *Stomoxys* spp., *Tabanus* spp., *Tannia* spp. and *Tipula* spp.;

from the order Hemiptera, for example, *Acanthocoris scabrator, Acrosternurn* spp, *Adelphocoris lineolatus, Amblypelta nitida, Bathycoelia thalassina, Blissus* spp, *Cimex* spp., *Clavigralla tomentosicoffis, Creontiades* spp, *Distantiella theobroma, Dichelops furcatus, Dysdercus* spp., *Edessa* spp, *Euchistus* spp., *Eurydema pulchrum, Eurygaster* spp., *Halyomorpha halys, Horcias nobilellus, Leptocorisa* spp., *Lygus* spp, *Margarodes* spp, *Murgantia histrionic, Neomegalotomus* spp, *Nesidiocoris tenuis, Nezara* spp., *Nysius simulans, Oebalus insularis, Piesma* spp., *Piezodorus* spp, *Rhodnius* spp., *Sahlbergella singularis, Scaptocoris castanea, Scotinophara* spp., *Thyanta* spp., *Triatoma* spp., and *Vatiga illudens;* from the order Homoptera, for example, *Acyrthosium pisum, Adalges* spp, *Agalliana ensigera, Agonoscena targionii, Aleurodicus* spp, *Aleurocanthus* spp, *Aleurolobus barodensis, Aleurothrixus floccosus, Aleyrodes brassicae, Amarasca biguttula, Amritodus atkinsoni, Aonidiella* spp., *Aonidiella auranti, Aphididae, Aphis* spp., *Aspidiotus* spp., *Aulacorthum solani, Bactericera cockereffi, Bemisia* spp, *Brachycaudus* spp, *Brevicoryne brassicae, Cacopsylla* spp, *Cavariella aegopodii*

*Scop., Ceroplaster* spp., *Chrysomphalus aonidium, Chrysomphalus dictyospermi, Cicadella* spp, *Cofana spectra, Cryptomyzus* spp, *Cicadulina* spp, *Coccus hesperidum, Dalbulus maidis, Dialeurodes* spp, *Diaphorina citri, Diuraphis noxia, Dysaphis* spp, *Empoasca* spp., *Eriosoma larigerum, Erythroneura* spp., *Gascardia* spp., *Glycaspis brimblecombei, Hyadaphis pseudobrassicae, Hyalopterus* spp, *Hyperomyzus pallidus, Idioscopus clypealis, Jacobiasca lybica, Laodelphax* spp., *Lecanium corni, Lepidosaphes* spp., *Lopaphis erysimi, Lyogenys maidis, Macrosiphum* spp., *Mahanarva* spp, *Metcalfa pruinosa, Metopolophium dirhodum, Myndus crudus, Myzus* spp., *Neotoxoptera* sp, *Nephotettix* spp., *Nilaparvata* spp., *Nippolachnus piri Mats, Odonaspis ruthae, Oregma lanigera Zehnter, Parabemisia myricae, Paratrioza cockerelli, Parlatoria* spp., *Pemphigus* spp., *Peregrinus maidis, Perkinsiella* spp, *Phorodon humuli, Phylloxera* spp, *Planococcus* spp., *Pseudaulacaspis* spp., *Pseudococcus* spp., *Pseudatomoscelis seriatus, Psylla* spp., *Pulvinaria aethiopica, Quadraspidiotus* spp., *Quesada gigas, Recilia dorsalis, Rhopalosiphum* spp., *Saissetia* spp., *Scaphoideus* spp., *Schizaphis* spp., *Sitobion* spp., *Sogatella furcifera, Spissistilus festinus, Tarophagus Proserpina, Toxoptera* spp, *Trialeurodes* spp, *Tridiscus sporoboli, Trionymus* spp, *Trioza erytreae, Unaspis citri, Zygina flammigera*, and *Zyginidia scutellaris;* from the order Hymenoptera, for example, *Acromyrmex, Arge* spp, *Atta* spp., *Cephus* spp., *Diprion* spp., *Diprionidae, Gilpinia polytoma, Hoplocampa* spp., *Lasius* spp., *Monomorium pharaonis, Neodiprion* spp., *Pogonomyrmex* spp, *Slenopsis invicta, Solenopsis* spp. and *Vespa* spp.;

from the order Isoptera, for example, *Coptotermes* spp, *Cornitermes cumulans, Incisitermes* spp, *Macrotermes* spp, *Mastotermes* spp, *Microtermes* spp, *Reticulitermes* spp.; *Solenopsis geminate;* from the order Lepidoptera, for example, *Acleris* spp., *Adoxophyes* spp., *Aegeria* spp., *Agrotis* spp., *Alabama argillaceae, Amylois* spp., *Anticarsia gemmatalis, Archips* spp., *Argyresthia* spp, *Argyrotaenia* spp., *Autographa* spp., *Bucculatrix thurberiella, Busseola fusca, Cadra cautella, Carposina nipponensis, Chilo* spp., *Choristoneura* spp., *Chrysoteuchia topiaria, Clysia ambiguella, Cnaphalocrocis* spp., *Cnephasia* spp., *Cochylis* spp., *Coleophora* spp., *Colias lesbia, Cosmophila flava, Crambus* spp, *Crocidolomia binotalis, Cryptophlebia leucotreta, Cydalima perspectalis, Cydia* spp., *Diaphania perspectalis, Diatraea* spp., *Diparopsis castanea, Earias* spp., *Eldana saccharina, Ephestia* spp., *Epinotia* spp, *Estigmene acrea, Etiella zinckinella, Eucosma* spp., *Eupoecilia ambiguella, Euproctis* spp., *Euxoa* spp., *Feltia jaculiferia, Grapholita* spp., *Hedya nubiferana, Heliothis* spp., *Hellula undalis, Herpetogramma* spp, *Hyphantria cunea, Keiferia lycopersicella, Lasmopalpus lignosellus, Leucoptera scitella, Lithocollethis* spp., *Lobesia botrana, Loxostege bifidalis, Lymantria* spp., *Lyonetia* spp., *Malacosoma* spp., *Mamestra brassicae, Manduca sexta, Mythimna* spp, *Noctua* spp, *Operophtera* spp., *Orniodes indica, Ostrinia nubilalis, Pammene* spp., *Pandemis* spp., *Panolis flammea, Papaipema nebris, Pectinophora gossypiela, Perileucoptera coffeella, Pseudaletia unipuncta, Phthorimaea operculella, Pieris rapae, Pieris* spp., *Plutella xylostella, Prays* spp., *Pseudoplusia* spp, *Rachiplusia nu, Richia albicosta, Scirpophaga* spp., *Sesamia* spp., *Sparganothis* spp., *Spodoptera* spp., *Sylepta derogate, Synanthedon* spp., *Thaumetopoea* spp., *Tortrix* spp., *Trichoplusia ni, Tuta absoluta*, and *Yponomeuta* spp.;

from the order Mallophaga, for example, *Damalinea* spp. and *Trichodectes* spp.;

from the order Orthoptera, for example, *Blatta* spp., *Blattella* spp., *Gryllotalpa* spp., *Leucophaea maderae, Locusta* spp., *Neocurtilla hexadactyla, Periplaneta* spp., *Scapteriscus* spp, and *Schistocerca* spp.;

from the order Psocoptera, for example, *Liposcelis* spp.;

from the order Siphonaptera, for example, *Ceratophyllus* spp., *Ctenocephalides* spp. and *Xenopsylla cheopis;* from the order Thysanoptera, for example, *Calliothrips phaseoli, Frankliniella* spp., *Heliothrips* spp, *Hercinothrips* spp., *Parthenothrips* spp, *Scirtothrips aurantii, Sericothrips variabilis, Taeniothrips* spp., *Thrips* spp; and/or from the order Thysanura, for example, *Lepisma saccharina.*

Examples of soil-inhabiting pests, which can damage a crop in the early stages of plant development, are:

from the order Lepidoptera, for example, *Acleris* spp., *Aegeria* spp., *Agrotis* spp., *Alabama argillaceae, Amylois* spp., *Autographa* spp., *Busseola fusca, Cadra cautella, Chilo* spp., *Crocidolomia binotalis, Diatraea* spp., *Diparopsis castanea, Elasmopalpus* spp., *Heliothis* spp., *Mamestra brassicae, Phthorimaea operculella, Plutella xylostella, Scirpophaga* spp., *Sesamia* spp., *Spodoptera* spp. and *Tortrix* spp.;

from the order Coleoptera, for example, *Agriotes* spp., *Anthonomus* spp., *Atomaria linearis, Chaetocnema tibialis, Conotrachelus* spp., *Cosmopolites* spp., *Curculio* spp., *Dermestes* spp., *Diabrotica* spp., *Dilopoderus* spp., *Epilachna* spp., *Eremnus* spp., *Heteronychus* spp., *Lissorhoptrus* spp., *Melolontha* spp., *Orycaephilus* spp., *Otiorhynchus* spp., *Phlyctinus* spp., *Popiffia* spp., *Psyffiodes* spp., *Rhizopertha* spp., *Scarabeidae, Sitotroga* spp., *Somaticus* spp., *Tanymecus* spp., *Tenebrio* spp., *Tribolium* spp., *Trogoderma* spp. and *Zabrus* spp.;

from the order Orthoptera, for example, *Gryllotalpa* spp.;

from the order Isoptera, for example, *Reticulitermes* spp.;

from the order Psocoptera, for example, *Liposcelis* spp.;

from the order Anoplura, for example, *Haematopinus* spp., *Linognathus* spp., *Pediculus* spp., *Pemphigus* spp. and *Phylloxera* spp.;

from the order Homoptera, for example, *Eriosoma larigerum;* from the order Hymenoptera, for example, *Acromyrmex, Atta* spp., *Cephus* spp., *Lasius* spp., *Monomorium pharaonis, Neodiprion* spp., *Solenopsis* spp. and *Vespa* spp.;

from the order Diptera, for example, *Tipula* spp.;

crucifer flea beetles (*Phyllotreta* spp.), root maggots (*Delia* spp.), cabbage seedpod weevil (*Ceutorhynchus* spp.) and aphids.

In particular, the compositions of the invention may be applied against insects from the order Homoptera (in particular, white flies, aphids, psyllids and armoured and soft scales), Thysanoptera (thrips), Acarina (mites) and Lepidoptera (butterflies and moths, and larva thereof). Preferably, the compositions of the invention may be applied against white flies, aphids, thrips.

Crops of useful plants in which the compositions according to the invention can be used include perennial and annual crops, such as berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, bluegrass, bentgrass, centipede grass, fescue, ryegrass, St. Augustine grass and Zoysia grass; herbs such as basil, borage, chives, coriander, lavender, lovage, mint, oregano, parsley, rosemary, sage and thyme; legumes for example beans, lentils, peas and soya beans; nuts for example almond, cashew, ground nut, hazelnut, peanut, pecan, pistachio and walnut; palms for example oil palm; ornamentals for example flowers, shrubs and trees; other trees, for example cacao, coconut, olive and rubber; vegetables for example asparagus, aubergine, broccoli, cabbage, carrot, cucumber, garlic, lettuce, marrow, melon, watermelon, okra, onion, leek, pepper, potato, pumpkin, squash, rhubarb, spinach and tomato; and vines for example grapes. The compositions of the invention can also be applied on turf, lawn and pastures.

Preferably, the compositions of the invention may be applied to a crop of a useful plant selected from:

- the order Solanacea (including tomato, potato, aubergine, chilli, pepper, tobacco);
- the order Cucurbitaceae (including squash, pumpkin, watermelon, melon, cucumber);
- the order Alliaceae (including onion, garlic, leek);
- the order Asparagacea (including asparagus).

Preferably, the composition of the invention may be applied to a crop of a useful plant selected from cucumber, squash, pepper, melon, watermelon, tomato, aubergine, courgette or gourd.

The rate at which the agrochemical compositions of the invention are applied will depend upon the particular type of insect, etc, to be controlled, the degree of control required and the timing and method of application and can be readily determined by the person skilled in the art. In general, the compositions of the invention can be applied at an application rate of between 0.005 kilograms/hectare (kg/ha) and about 5.0 kg/ha, based on the total amount of active ingredient in the composition. An application rate of between about 0.1 kg/ha and about 1.5 kg/ha is preferred, with an application rate of between about 0.1 g/ha and 0.5 kg/ha being especially preferred.

The pesticidal compositions of the present invention may be used as an insecticide to control pests on cotton plants or soybean plants, in particular for the control of insects from the order Homoptera (in particular, white flies, aphids, psyllids and armoured and soft scales), Thysanoptera (thrips) and Acarina (mites).

In particular, transgenic cotton events expressing useful traits which may be used in combination with the compositions of the invention, include BXN10211, BXN10215, BXN10222, BXN10224, COT102, COT67B, GHB614, GHB119, LLCotton25, MON531, MON757, MON15985, MON1445, MON88913, MON1076, MON1698, MON88701, T304-40, 281-24-236, 3006-210-23, 31707, 31803, 31808, 42317, and the like. Such combinations of the compositions of the invention with cotton events expressing one or more useful traits may provide more durable yield protection, provide a resistance management strategy for target pest control, and reduce farmer inputs, saving considerable expense in time and monetary value.

Furthermore, transgenic soybean plants expressing toxins, for example insecticidal proteins such as delta-endotoxins, e.g. Cry1Ac (Cry1Ac Bt protein) may be used in combination with the compositions of the invention. Accordingly, this may include transgenic soybean plants comprising event MON87701 (see U.S. Pat. No. 8,049,071 and related applications and patents, as well as WO 2014/170327 A1 (eg, see paragraph reference to Intacta RR2 PRO™ soybean)), event MON87751 (US. Patent Application Publication No. 2014/0373191) or event DAS-81419 (U.S. Pat. No. 8,632,978 and related applications and patents).

Other transgenic soybean plants may comprise event SYHT0H2-HPPD tolerance (U.S. Patent Application Publication No. 2014/0201860 and related applications and patents), event MON89788—glyphosate tolerance (U.S. Pat. No. 7,632,985 and related applications and patents), event MON87708—dicamba tolerance (U.S. Patent Application Publication No. US 2011/0067134 and related applications and patents), event DP-356043-5—glyphosate and ALS tolerance (U.S. Patent Application Publication No. US 2010/0184079 and related applications and patents), event A2704-12—glufosinate tolerance (U.S. Patent Application Publication No. US 2008/0320616 and related applications and patents), event DP-305423-1—ALS tolerance (U.S. Patent Application Publication No. US 2008/0312082 and related applications and patents), event A5547-127—glufosinate tolerance (U.S. Patent Application Publication No. US 2008/0196127 and related applications and patents), event DAS-40278-9—tolerance to 2,4-dichlorophenoxyacetic acid and aryloxyphenoxypropionate (see WO 2011/022469, WO 2011/022470, WO 2011/022471, and related applications and patents), event 127—ALS tolerance (WO 2010/080829 and related applications and patents), event GTS 40-3-2—glyphosate tolerance, event DAS-68416-4-2,4-dichlorophenoxyacetic acid and glufosinate tolerance, event FG72—glyphosate and isoxaflutole tolerance, event BPS-CV127-9—ALS tolerance and GU262—glufosinate tolerance or event SYHT04R—HPPD tolerance.

In an aqueous composition comprising the pesticidal composition according to the invention (eg, a tank-mix composition for spraying) there may be added a further pesticidal active ingredient component (eg, at a weight ratio of 1:1 to spiropidion) selected from one of:

Abamectin, Acequinocyl, Acetoprole, Acrinathrin, Acynonapyr, Afidopyropen, Afoxalaner, Alanycarb, Allethrin, Alpha-Cypermethrin, Alphamethrin, Amidoflumet, Aminocarb, Azocyclotin, Bensultap, Benzoximate, Benzpyrimoxan, Betacyfluthrin, Beta-cypermethrin, Bifenazate, Bifenthrin, Binapacryl, Bioallethrin, Bioallethrin 5)-cyclopentylisomer, Bioresmethrin, Bistrifluron, Broflanilide, Brofluthrinate, Bromophos-ethyl, Buprofezine, Butocarboxim, Cadusafos, Carbaryl, Carbosulfan, Cartap, CAS number: 1472050-04-6, CAS number: 1632218-00-8, CAS number: 1808115-49-2, CAS number: 2032403-97-5, CAS number: 2044701-44-0, CAS number: 2128706-05-6, CAS number: 2249718-27-0, Chlorantraniliprole, Chlordane, Chlorfenapyr, Chloroprallethrin, Chromafenozide, Clenpirin, Cloethocarb, Clothianidin, 2-chlorophenyl N-methylcarbamate (CPMC), Cyanofenphos, Cyantraniliprole, Cyclaniliprole, Cyclobutrifluram, Cycloprothrin, Cycloxaprid, Cycloxaprid, Cyenopyrafen, Cyetpyrafen (or Etpyrafen), Cyflumetofen, Cyfluthrin, Cyhalodiamide, Cyhalothrin, Cypermethrin, Cyphenothrin, Cyproflanilide, Cyromazine, Deltamethrin, Diafenthiuron, Dialifos, Dibrom, Dicloromezotiaz, Diflovidazine, Diflubenzuron, dimpropyridaz, Dinactin, Dinocap, Dinotefuran, Dioxabenzofos, Emamectin, Empenthrin, Epsilon-momfluorothrin, Epsilon-metofluthrin, Esfenvalerate, Ethion, Ethiprole, Etofenprox, Etoxazole, Famphur, Fenazaquin, Fenfluthrin, Fenitrothion, Fenobucarb, Fenothiocarb, Fenoxycarb, Fenpropathrin, Fenpyroxymate, Fensulfothion, Fenthion, Fentinacetate, Fenvalerate, Fipronil, Flometoquin, Flonicamid, Fluacrypyrim, Fluazaindolizine, Fluazuron, Flubendiamide, Flubenzimine, Flucitrinate, Flucycloxuron, Flucythrinate, Fluensulfone, Flufenerim, Flufenprox, Flufiprole, Fluhexafon, Flumethrin, Fluopyram, Flupyradifurone, Flupyrimin, Fluralaner, Flupentiofenox, Fluvalinate, Fluxametamide, Fosthiazate, Gamma-Cyhalothrin, Gossyplure™, Guadipyr, Halofenozide, Halofenozide, Halofenprox, Heptafluthrin, Hexythiazox, Hydramethylnon, Imicyafos, Imidacloprid, Imiprothrin, Indoxacarb, Iodomethane, Iprodione, Isocycloseram, Isothioate, Ivermectin, Kappa-bifenthrin, Kappa-tefluthrin, Lambda-Cyhalothrin, Lepimectin, Lufenuron, Metaflumizone, Metaldehyde, Metam, Methomyl, Methoxyfenozide, Metofluthrin, Metolcarb, Mexacarbate, Milbemectin, Momfluorothrin, nicofluprole Niclosamide, Nitenpyram, Nithiazine, Omethoate, Oxamyl, Oxazosulfyl, Parathion-ethyl, Permethrin, Phenothrin, Phosphocarb, Piperonylbutoxide, Pirimicarb, Pirimiphos-ethyl, Polyhedrosis virus, Prallethrin, Profenofos, Profenofos, Profluthrin, Propargite, Propetamphos, Propoxur, Prothiophos, Protrifenbute, Pyflubumide, Pymetrozine, Pyraclofos, Pyrafluprole, Pyridaben, Pyridalyl, Pyrifluquinazon, Pyrimidifen, Pyrimostrobin, Pyriprole, Pyriproxyfen, Resmethrin, Sarolaner, Selamectin, Silafluofen, Spinetoram, Spinosad, Spirodiclofen, Spiromesifen, Spirotetramat, Sulfoxaflor, Tebufenozide, Tebufenpyrad, Tebupirimiphos, Tefluthrin, Temephos, Tetrachloraniliprole, Tetradiphon, Tetramethrin, Tetramethylfluthrin, Tetranactin, Tetraniliprole, Theta-cypermethrin, Thiacloprid, Thiamethoxam, Thiocyclam, Thiodicarb, Thiofanox, Thiometon, Thiosultap, Tioxazafen, Tolfenpyrad, Toxaphene, Tralomethrin, Transfluthrin, Triazamate, Triazophos, Trichlorfon, Trichloronate, Trichlorphon, Triflumezopyrim, Tyclopyrazoflor, Zeta-Cypermethrin.

The pesticidal compositions of the present invention may be prepared according to standard procedures known in the art.

As already indicated, the pesticidal compositions of the present invention have, for practical purposes, a very advantageous level of activity in controlling insect pests in crops of useful plants after foliar or soil application, whilst also maintaining acceptable crop safety (phytotoxicity) outcomes. Further, the compositions of the present invention when in an agrochemical formulation may possess any number of other benefits compared to other compositions including, inter alia, the prevention of sedimentation, thickening, phase separation, cloudiness, foaming or crystal growth, chemical stability of the spiropidion active ingredient (degradation), long-term formulation stability (eg, at high temperature, such as 45° C.), or reduced clogging of spray nozzles during application and spray drift.

EXAMPLES

The Examples which follow serve to illustrate the invention, and in particular, demonstrate chemical (active ingredient) and formulation stability for the pesticidal compositions. Table 1 (below) represents a composition A (as a suspension concentrate) according to the invention.

TABLE 1

| Component | Composition A (% by weight) |
|---|---|
| Spiropidion | 27.7 |
| Atlox ™ 4913 (acrylic graft copolymer solution in water and propylene glycol) | 7.4 |
| MORWET ™ D-425 (sodium alkyl naphthalene sulfonate formaldehyde condensate) | 1.8 |
| Anti-freeze agent | 4.6 |
| Thickening agent | 0.5 |
| Preservative agent(s) | 0.3 to 0.4 |
| Buffering agent | 0.2 |
| Anti-foam agent | 0.2 |
| Water | up to 100% |

After storage for 12 weeks at 40° C., no change in the physical properties was observed for Composition A as a stable suspension concentrate formulation according to the invention.

Further, only minimal chemical degradation of the active ingredient spiropidion was observed over a 1-year storage period at 35, 45 and 54° C. as outlined in Table 2 (intervals at 1, 3, 7.5 and 12 months). The percentage amount of spiropidion remaining at each time interval during the high temperature storage testing was compared to an identical sample stored at −18° C. (100%=amount of spiropidion in the −18° C. sample at respective time interval).

TABLE 2

| Storage | % Spiropidion remaining | | | |
|---|---|---|---|---|
| temperature (° C.) | 1 month | 3 months | 7.5 months | 12 months |
| 35 | — | 100 | 99 | 98 |
| 45 | — | 98 | 97 | — |
| 54 | 99 | — | — | — |

These data clearly demonstrate the formulation stability and spiropidion active ingredient stability of the compositions of the invention during a high temperature storage test.

The invention claimed is:

1. A pesticidal composition comprising:

(a) 20 to 35% by weight of spiropidion as active ingredient, and (b) 5.5 to 15% by weight of a dispersing agent combination, comprising:

(i) 5 to 10% by weight of the total composition of an acrylic graft copolymer solution in water and propylene glycol; and (ii) 0.5 to 5% by weight of the total composition of a sodium alkyl naphthalene sulfonate formaldehyde condensate.

2. The pesticidal composition according to claim 1, which is a suspension concentrate.

3. The pesticidal composition according to claim 1, wherein spiropidion is present at 25 to 30% by weight.

4. The pesticidal composition according to claim 1, wherein component (i) comprises a methyl methacrylate/methacrylic acid/monomethoxypolyethylene glycol (PEG) methacrylate graft copolymer having a number average molecular weight of 2,500 to 3,000 Da.

5. The pesticidal composition according to claim 1, wherein component (i) is present at 6 to 9% by weight of the total composition.

6. The pesticidal composition according to claim 1, wherein component (ii) is present at 1 to 3% by weight of the total composition.

7. The composition according to claim 1, further comprising one or more additional ingredients selected from an anti-freeze agent, an anti-foam agent, a thickening agent, a biocide (preservative), a buffering agent, a stabilizer and/or a pigment.

8. An aqueous composition comprising the pesticidal composition according to claim 1, optionally further comprising one or more adjuvants or carriers.

9. A method of combating and controlling pests which comprises applying to a pest, to a locus of a pest, or to a crop of a useful plant susceptible to attack by a pest, a composition according to claim 8.

10. The method according to claim 9, wherein the pest is selected from the order Homoptera, Thysanoptera, Acarina or Lepidoptera.

11. The method according to claim 10, wherein the pest is selected from white flies, aphids, *thrips*.

12. The method according to claim 9, wherein the plant is a perennial plant selected from coffee, citrus, or grape vine.

13. The method according to claim 9, wherein the plant is soybean or cotton, or the plant is selected from the order Cucurbitaceae or the order Solanaceae.

14. A method of using the composition according to claim 8 for controlling a pest by applying the composition to the growth substrate of a crop of a useful plant.

15. The method according to claim 14, wherein the growth substrate is soil and the application is by drip, drenching or injection of the composition to the soil.

* * * * *